United States Patent [19]

Sigona et al.

[11] Patent Number: 5,694,150
[45] Date of Patent: Dec. 2, 1997

[54] MULTIUSER/MULTI POINTING DEVICE GRAPHICAL USER INTERFACE SYSTEM

[75] Inventors: Michael R. Sigona, Knoxville; Anthony Winner, Oak Ridge, both of Tenn.

[73] Assignee: Elo Touchsystems, Inc., Fremont, Calif.

[21] Appl. No.: 531,426

[22] Filed: Sep. 21, 1995

[51] Int. Cl.[6] ..................................... G09G 5/08
[52] U.S. Cl. ........................... 345/145; 345/146
[58] Field of Search .................... 345/145, 146, 345/157, 160; 395/340, 650

[56] References Cited

U.S. PATENT DOCUMENTS

| | | | |
|---|---|---|---|
| Re. 33,151 | 1/1990 | Adler | 340/712 |
| 3,673,327 | 6/1972 | Johnson et al. | 178/18 |
| 4,642,423 | 2/1987 | Adler | 178/18 |
| 4,644,100 | 2/1987 | Brenner et al. | 178/18 |
| 4,645,870 | 2/1987 | Adler | 178/19 |
| 4,700,176 | 10/1987 | Adler | 340/365 |
| 4,746,914 | 5/1988 | Adler | 340/712 |
| 4,791,416 | 12/1988 | Adler | 340/712 |
| 4,987,551 | 1/1991 | Garret et al. | 345/145 |
| 5,072,427 | 12/1991 | Knowles | 367/118 |
| 5,162,618 | 11/1992 | Knowles | 178/18 |
| 5,177,327 | 1/1993 | Knowles | 178/18 |
| 5,234,148 | 8/1993 | Stone et al. | 228/8 |
| 5,260,521 | 11/1993 | Knowles | 178/18 |
| 5,293,470 | 3/1994 | Birch et al. | 395/340 |
| 5,329,070 | 7/1994 | Knowles | 178/18 |
| 5,437,014 | 7/1995 | Busboom et al. | 395/275 |
| 5,442,376 | 8/1995 | Tannenbaum et al. | 345/156 |
| 5,442,788 | 8/1995 | Bier | 395/650 |
| 5,550,563 | 8/1996 | Matheny et al. | 345/145 |
| 5,581,670 | 12/1996 | Bier et al. | 345/146 |
| 5,594,471 | 1/1997 | Deeran et al. | 345/173 |

OTHER PUBLICATIONS

Knowles, T.J., "46.6: A Pressure-Responsive Touch-Input Device", SID 92 Digest, (1992) pp. 920–923.

Christensen, R. & Masters, T., "Guided Acoustic Wave: Newest Wave in Touch Technology", ECN (Jan. 1995), p. 13 et seq.

*Primary Examiner*—Regina D. Liang
*Assistant Examiner*—Ricardo Osorio
*Attorney, Agent, or Firm*—Furgang & Milde, LLP

[57] ABSTRACT

A graphical user interface system is provided having an event-driven control program with a unified user input pointing event stream without distinction of source and a graphical user interface having a virtual display space containing objects. The control program processing events related to a plurality of user inputs representing different locations within the virtual display space, and operates optionally in two modes. A first mode permits the plurality of user inputs to interact, allowing an object in the virtual display space at a first location specified by an initial user input to be associated with a second location specified by a concurrent and subsequently terminating user input. In this case, the control program has a counter which increments on activity of any user input and decrements on cessation of activity of any user input, for determining an initial user input condition, temporal concurrence of a plurality of user inputs, and a terminal user input condition. A second mode processes a series of events related to a first user input without apparent functional interference with a concurrent series of events related to a second user input.

32 Claims, 7 Drawing Sheets

MULTIUSER/MULTI POINTING DEVICE GRAPHICAL USER INTERFACE SYSTEM

FIELD OF THE INVENTION

The present invention relates to the field of event-driven graphical user interface systems, and more particularly to a system for modifying a graphical user interface response to user generated events in order to allow multiple user inputs to act in concert.

BACKGROUND OF THE INVENTION

A number of graphical user interface (GUI) systems are available. These include Microsoft Windows, IBM OS/2, Sun Microsystems Solaris, and Apple Computer Macintosh Operating System. These systems have a pointing device input associated with a display, with a screen cursor defining an active position. The cursor typically is a graphic object defining an active pixel, region or a position, the location of which on the screen is varied by manipulation of the pointing device. The screen image may include a number of display objects, including pull-down menu bars, dialog boxes, windows, and icons. Superimposing the cursor over a defined screen object allows that object to be selected, with a resulting function activated.

These GUI systems may allow a number of programs to be available, although not all allow true simultaneous interaction.

These interfaces may be event-driven, i.e., change state based on defined occurrences, such as user input, timer output, or interrupts, or may continuously monitor inputs to determine their status.

Known user pointing inputs include the mouse, trackball, joystick, light pen, touchpad, tablet and touchscreen. The touchscreen, touchpad, light pen and tablet provide absolute positional coordinate inputs, while the mouse, trackball and joystick provide relative motion inputs. A number of different types of touchscreens are available, including surface acoustic wave, resistive, capacitive, infrared, and force-sensitive types.

In commonly known acoustic touchscreen position sensors, a transducer emits an acoustic pulse, which is spread as a wave across a touchscreen, and received by the same or different transducer. The wave has a characteristic time delay for each incremental distance along a common path, so that the position along a coordinate axis may be determined by a time-based analysis of the received pulse. Systems are provided for at least two orthogonal axes. See, U.S. Pat. Nos. 4,642,423, 4,644,100, 4,645,870, 4,700,176, 4,746,914 and 4,791,416, U.S. Pat. No. Re. 33,151, U.S. Pat. Nos. 5,260,521, 5,234,148, 5,329,070, 5,177,327, 5,162,618 and 5,072,427, incorporated herein by reference. See also, U.S. Pat. No. 3,673,327; Knowles, T. J., "46.6: A Pressure-Responsive Touch-input Device", SID 92 Digest, (1992) pp. 920–923; Christensen, R. and Masters, T., "Guided Acoustic Wave: Newest Wave in Touch Technology", ECN (January 1995), pp. 13 et seq.

Computer mice are also known. In commonly known devices, a hand held device having a computer connection cable is provided. The device and cable configuration vaguely resembles a mouse, hence the name. In a mechanical mouse, a spherical ball is provided which grips a reference surface and tracks a relative movement. Internal to the mouse, the rotation of the ball along two orthogonal axes is measured by wheels which press against the ball, gripping along a respective rotational axis and slipping along a respective non-rotational axis. Thus, each wheel resolves an orthogonal component of rotation. A mechanical or optical sensor is provided to determine the amount of rotation of each wheel, which is transmitted by the cable to the computer as a relative movement along each axis. Cordless designs, as well as designs with no moving parts are also known. Trackballs employ an inverted configuration, with the hand or fingers of the user serving as the reference surface.

Multi-screen display driver systems are known. These systems allow multiple viewing "ports" on a single GUI operating system workspace, such as might be employed in process control or multimedia applications, where display screens may be dedicated to particular information or tasks. The virtual image or "desktop" is enlarged across multiple displays, such as with a video wall. These systems, however, do not include provision for processing simultaneous inputs from a number of user inputs to control the GUI.

Known multiple-display systems are made by STB Systems, Richardson, Tex. including the MVP-4X Adapter. Colorgraphics Communications (Atlanta, Ga.) manufactures a number of multiple VGA adapters, including PCMCIA Voyager VGA, Twin Turbo Accelerator, Super Warp, Warp 4, and POS Video Adapter, Dual VGA Flap Panel, Pro Lightening Series, which allow a Microsoft Windows, Windows NT or OS/2 based computer to have more than one active display. Multi-display adapter cards are also available from Easy Systems (Belgium), and Micro Deutschland (Germany).

U.S. Pat. No. 5,437,014 (Busboom, et al.), incorporated herein by reference, relates to a system having multiple terminal devices dependent from a main processor, supporting mouse events, and executing multiple application programs. The main processor separates the activity of the dependent workstations, and therefore has multiple workspaces. Each mouse event is therefore associated with a workstation task.

U.S. Pat. No. 5,442,376 (Tannenbaum et al.), incorporated herein by reference, relates to a multi-tasking graphical environment supporting a plurality of inputs. These inputs are not symmetrical, although a consistent interface is provided. Therefore, each input source is particularly distinguished during processing.

U.S. Pat. No. 5,442,788 (Bier), incorporated herein by reference, relates to a multi-user multi-device system in which a plurality of users can control a single screen. Each user is provided with one or more input devices, which can be used to control one or more applications. At any time, the system produces a consistent view of all applications on the single screen. The input from each user produces a response customized to the preferences of that user, and events caused by these inputs are identified by source. Inputs to the system initiate the building of Event Records that are queued and then directed to specific applications. The software manages input streams from multiple devices at once, keeping track of which input comes from which user. Except where user actions conflict, the system allows all activities to proceed at once; where there is a conflict, updates wait for a pause.

SUMMARY AND OBJECTS OF THE INVENTION

The present invention applies a multiple screen display driver system, with a corresponding plurality of user inputs, to provide a multi-user environment on displaced portions of a large virtual image space. Thus, a single computing system having an event-driven GUI operating system may receive input from the plurality of input devices and control the display or displays, providing each user apparent exclusive and uninterrupted control over a dedicated region or interactive control over a shared region or object.

Because the GUI operating systems used in conjunction with the present invention are commonly event-driven, with a single event queue and a single virtual workspace, an event associated with one user input exclusively appropriates the processor during event processing. Thus, an event is placed in a queue, and each event is serviced by a service routine generally in the order of occurrence or priority. The present invention does not alter the event processing by including an input device identifier with the pointing device event, hereinafter referred to as the mouse event, in the queue, and therefore does not require substantial modifications to existing operating systems or applications. Therefore, the input device driver system must process the mouse events in context to properly transmit them to the operating system and application programs. This context may be, for example, the number of simultaneous pointing device activation events, hereinafter referred to as mouse button depression events, which of course are generated in different ways by a number of various input devices.

Since these operating systems are designed for a single simultaneous user, the operating system does not make provision for the distinction between multiple pointing device inputs, and detects only single occurrences of mouse button events. Therefore, prior art systems subject to a plurality of simultaneously active user input devices were unable to resolve events created by different user inputs acting in that same virtual display space, causing confusion and interference. The present invention therefore provides an input device interface system for determining a change in system status as a result of a processed event from a user input, thereby allowing processing of that event in context, and not disturbing the processing of other unrelated events, so that event processing may proceed without apparent interference.

The present invention preferably does not divide or segment the virtual display space into separate user areas, nor particularly distinguish pointing inputs from different sources. Therefore, pointing inputs from different sources appear symmetric. Further, two different user inputs may interact when desired, e.g., to indicate the source and destination of a drag operation. The present invention includes a "mouse button depression" counter to define a status of the system prior to processing an event and to allow determination of a change in status as a result of processing the event. This aspect of operation is important because user pointing device input events have significant functions triggered by "button down" and "button up" status.

The present system therefore allows discrimination of status changes relating to a plurality of user inputs without altering the structure of the operating system. Since this functionality may be compartmentalized as an interrupt service routine, processing new user inputs, a preferred implementation is a software-based device driver for a computing system, which responds to an interrupt service call.

Upon receipt of a new input occurrence, an event is defined and placed in a queue for processing. This event defines the type of device (e.g., pointing device), location (e.g., x, y coordinates) and status (e.g., button down, button up). It is presumed that all of the relevant user input devices have the same device type in the event queue, i.e., that keyboard input events are not considered in the analysis. If a new button down event or new button up event occurs, then a counter is incremented or decremented, respectively. Otherwise, the counter remains unchanged.

Two modes of operation are defined. In a first mode, a plurality of users are intended to operate independently, without interference. In a second mode, one or more user inputs are intended to operate cooperatively.

In the first mode, if a new touch occurs, i.e., if the touch counter has been incremented, a button click, e.g., cursor move followed by a "button down" followed by "button up" sequence is generated. This sequence filters the event stream to only assert a new "button down" event on new touches. If no new touch is detected, then the system takes no action on the event and continues processing the event queue. In this mode, drag and double-click operations are not supported. On each new touch, the cursor position is controlled by the associated pointing device. Therefore, an absolute position pointing device, such as a touchscreen, causes the cursor to move to the location of each touch.

In the second mode, the critical question is whether the touch counter is decremented to zero, as this distinguishes when a single touch was released from a situation where one of a multitude of touches was released and at least one touch is still present. In general, the second mode allows cooperation between inputs by allowing a "hand-off" between two user inputs on the cursor position without generating a "button up" event, which normally terminates a processing sequence. Thus, if there are multiple touches registered, the system continually processes the event queue, but does not process a touch-release as a "button up" event until the last touch is released. This allows the two or more user inputs to compete for system attention, with none actually gaining full control, until it is the last or only input. Thus, a first user input may be used to select an object within the virtual display space, which may then be handed off to a second user input on a second virtual display space for completion of an operation. When the touch counter is decremented to zero, a "button up" event is finally generated. If the touch counter is not decremented to zero, the user inputs are processed as "drag" events, even if a new touch is added or an old touch removed. In the second mode, drag and double click operations are supported.

In the first mode, the system software is designed so that each sequence of events for each user may be interrupted and that significant individual events are buffered. Thus, each user appears to have control over the system, because the interruptions are momentary and transparent, for sufficiently powerful computer systems.

Preferably, in order to avoid interference between users in the first mode, each user is provided with access to a particular application, and is restricted access to the operating system as a whole. This is implemented by providing each user with a GUI display space which does not include system level functionality and limiting the ability to escape the boundaries of the display space.

Where absolute position pointing devices, such as touchscreens, light pens, pressure sensitive screens, are employed, the device driver for each such pointing device provides the operating system with a pointing coordinate. Therefore, the pointing input is unambiguous. With these types of pointing devices, no visible cursor need be presented to the user, since the position of touch identifies the cursor position. In this case, the rapid movement of the system cursor position is invisible to the user, and need not be addressed.

In the case of other pointing devices, such as touchpads, mice, and trackballs, it is preferable to present a visible cursor as feedback for the of the cursor, so the user as to the cursor position. In this case, since each pointing device event generates an interrupt, updating the cursor positions, a visible cursor would flicker between the various pointing device position, causing an arbitration problem among the various pointing devices for control of the cursor. Therefore, it is preferable in this case to deactivate display of the system cursor, and instead capture the pointing position of each pointing input device and display a graphic object on the screen associated with the position of each pointing device. Therefore, multiple user cursors will appear in the virtual display space, one for each pointing input, yet the operating system still recognizes a single cursor position. The capturing of pointing device input and display of such graphic objects in the virtual display space at an appropriate actual display position is within the ordinary skill in the art.

In the case of relative position pointing input devices, such as mice and trackballs, a further enhancement is preferred. Normally, these devices generate cursor relative position movement data. This is appropriate if the starting position of the cursor is defined by the past history of movements of a particular pointing device. However, where a plurality of pointing devices independently reposition the cursor, the starting position may be inappropriate. Therefore, a driver is provided to translate the relative pointing device output to an absolute coordinate system, appropriate for the actual display device with which it is used and the virtual display space. Advantageously, this function may be combined with the graphic user cursor generating system described above, which will define an absolute user cursor position limited within the virtual display space. Thus, instead of transmitting messages defining relative movements of the cursor position, the driver system defines coordinate messages based on the past history of movement of the particular pointing device. This allows the use of various pointing devices.

It is noted that the input device driver does not alter the operation of the operating system, which is still essentially a single user type, with a single system cursor location. According to the present invention, user inputs are processed symmetrically based on pointing location, without significant distinction as to input source. The present system allows this single user, multi-tasking operating system to appear as a multiuser operating system.

Some display driver devices support hardware cursor display, and therefore may be used to show a user cursor somewhat independent of the operating system. Otherwise, the cursor position display and coordinate conversion operate as a device driver or application program.

According to the present invention, a normally single user interface system, conforming to certain rules, is made into a multiple user interface by providing a plurality of input devices, a virtual display screen encompassing a number of display windows, having a plurality of real display ports, wherein each display window is associated with an area of said virtual display screen, an input from one of the input devices associated with an area of said virtual display screen being associated with the associated display window, thereby transferring control to that window.

It is therefore an object of the present invention to provide a multiple display GUI system comprising a computer system having a processor, a display output interface and a user input interface; a plurality of displays, each presenting a graphic image and being responsive to said display output interface; a plurality of user input devices, each user input device being associated with one of said displays, and producing an input to said user input interface; said computer system executing an event-driven control program including a GUI having a unified virtual display space, each of said input devices producing events; being for simultaneously receiving user inputs from said plurality of user input devices, displaying information relating to said user inputs on said plurality of displays, said graphic image presented on each of said plurality of displays being at least a portion of said unified virtual display space, wherein at least two of said plurality of user input devices may used simultaneously to input GUI commands, with each user input having near real-time response to user input and each user input device having apparent continuous control over said graphic image of said associated display.

The display image may also be an image presented on multiple display devices simultaneously through the use of video splitters, which allow the presentation of the same image on multiple displays for use by one or more users.

According to one embodiment of the invention, a plurality of transparent touchscreens, superimposed on display monitors are provided, each allowing a user to touch the touchscreen, resulting in absolute position events, allowing an event to be generated by a simple touch or drag across the screen. Each display monitor may display the same or a different image.

The event-driven control program is preferably a GUI system selected from the group consisting of Windows, Windows for Workgroups, Windows NT, Windows 95, OS/2 and Macintosh operating systems. The displays are preferably color raster cathode ray tube (CRT) displays, but may also be liquid crystal, electroluminescent, vacuum fluorescent, light emitting diode, cold cathode or other display types.

The user input devices preferably comprise transparent touchscreens superimposed on said associated display, which may be surface acoustic wave, resistive, capacitive, infrared, force-sensitive or other known types. Of course, other types of pointing devices may be employed.

The system preferably includes at least two display devices and two user input devices. The display driver may be an integrated multi-display adapter or video splitter, while the input interface may be a multi-input device, a daisy-chained input device or separate devices.

According to another aspect of the invention, the multiple display GUI system is provided wherein said event-driven control program including a GUI having a unified virtual display space, produces a plurality of display windows in said unified virtual display space, only one of said display windows being associated with processed events at any instant, an input to one of said input devices producing an event associated with a window in said portion of said unified virtual display space of said associated display device, which is then processed.

The system may be implemented with comparatively standard hardware and operating systems, such as a processor executing the 80X86 instruction set group processors. Of course, other architectures, such as PowerPC, MIPS, SPARC, Alpha, or other CISC or RISC microprocessors may be used. A plurality of VGA, Super VGA or Windows accelerated display driver systems, integrated on a single board or on multiple boards, may be used. Video splitters may be used to present an image on multiple displays.

For a full understanding of the present invention, reference should now be made to the following detailed descrip-

BRIEF DESCRIPTION OF THE DRAWINGS

The preferred embodiments of the invention will be shown by way of drawings of the Figures, in which.

DETAILED DESCRIPTION OF THE PREFERRED EMBODIMENTS

The preferred embodiments of the present invention will now be described with reference to the Figures. Identical elements in the various figures of the present invention are designated with the same reference numerals.

A system is provided having a typical Windows, Windows for Workgroups, Windows 95, or OS/2 configuration, such as an 80486 DX2-66 or Pentium 66 processor, 16 MBytes of memory, and a 500-1080 MByte hard drive. A plurality of SVGA touchscreen monitors, having Elo touchscreens (Elo TouchSystems Inc., Oak Ridge, Tenn.), are interfaced through an STB MVP-4X display adapter and a plurality of RS-232 ports, using Elo "MonitorMouse" software driver for Windows, Windows NT, OS/2, or Macintosh in accordance with the present invention. These drivers allow typical Windows user input from the touchscreen inputs, such as click, double-click, move and resize window, drag and drop, scroll and pull-down menu selection. This system also allows DOS sessions to run with touchscreen input, as well.

Figure 1:
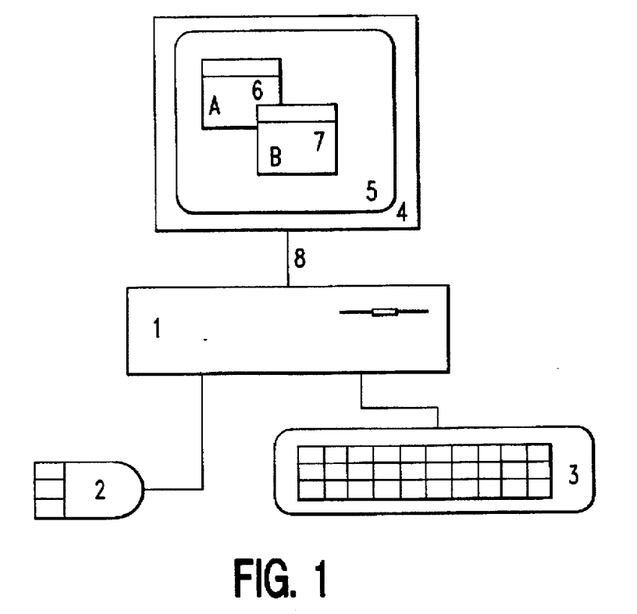
FIG. 1 is a semischematic view of a single user system running multiple windowed applications.

As known in the prior art, a system, as shown in FIG. 1, executes a plurality of applications, each occupying a window on a monitor. This system executes Windows for Workgroups operating system and MS-DOS 6.22. An Intel 80486 DX2/66 processor 1 is provided, having a standard complement of peripherals, including a mouse 2 and a keyboard 3. An SVGA monitor 4 is provided, having an Elo touchscreen 5. During use of the touchscreen 5, the mouse 2 is inactivated. Two windowed applications, 6, 7 are displayed on the monitor 4.

Figure 2:
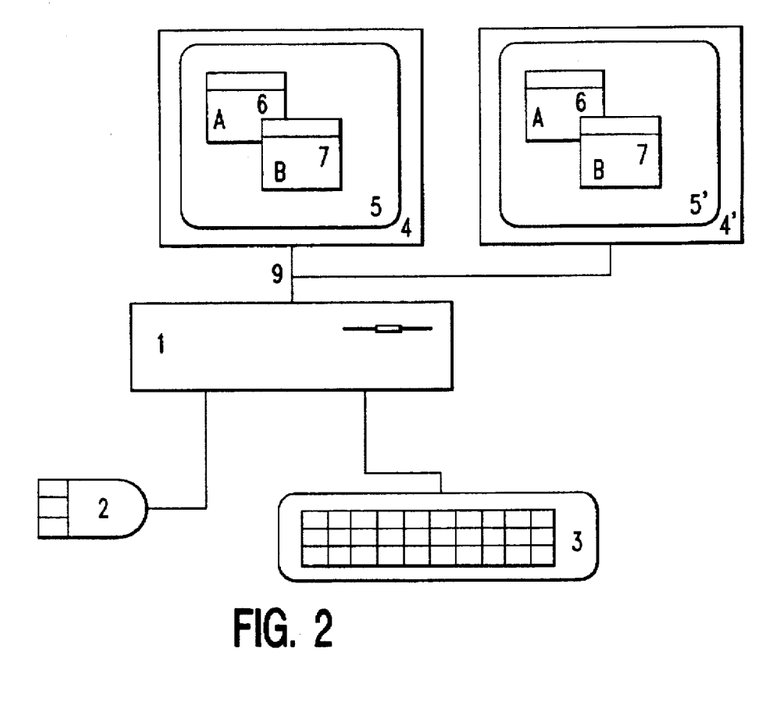
FIG. 2 is a semischematic view of a single user system running multiple windowed applications with a video splitter, displaying the same image on multiple displays.

FIG. 2 shows the system generally according to FIG. 1, having a video splitter 9, displaying windowed applications 6, 7 on monitors 4, 4' having touchscreens 5, 5'. The system according to the present invention allows simultaneous use of touchscreens on both monitors simultaneously.

Figure 3:
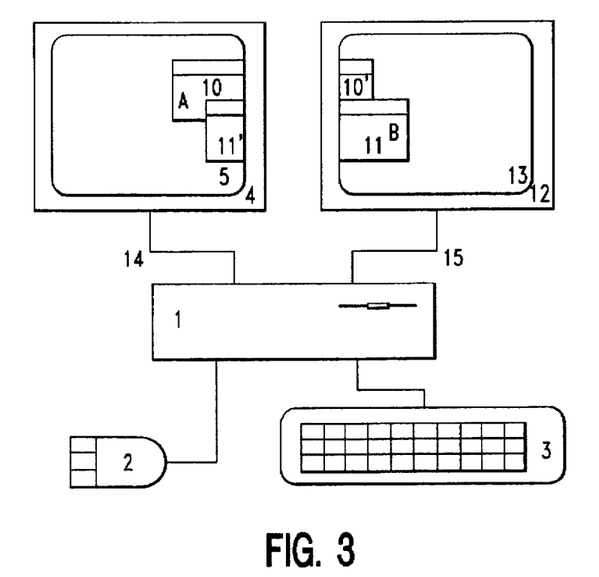
FIG. 3 is a semischematic view of a system running multiple windowed applications in a single virtual desktop, with a multiport video display adapter and a plurality of displays.

FIG. 3 shows the system generally according to FIG. 1, having a multiple output SVGA display driver 14, 15, STB model MVP-2X, driving SVGA monitors 4, 12, having touchscreens 5, 13. A single virtual display space is provided for the applications, which may span the various monitors 4, 12. Thus, portions of application A 10, 10', may be displayed on monitors 4, 12, and likewise, portions of application B 11, 11', may be displayed on monitors 12, 4. Touchscreens 5, 13 may be used simultaneously.

Figure 4:
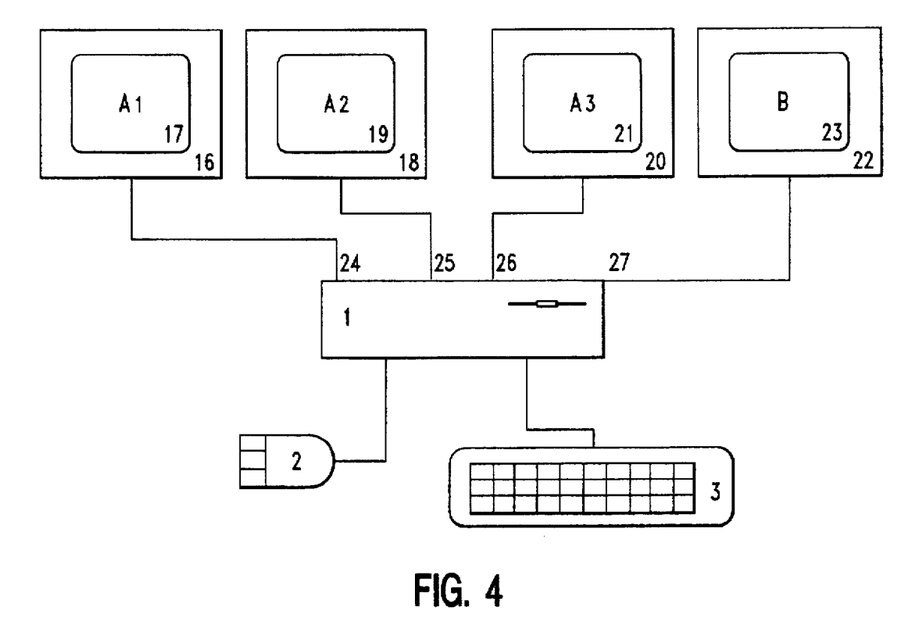
FIG. 4 is a semischematic view of a system running multiple windowed applications tiled on multiple display adapters in a single virtual desktop.

FIG. 4 shows the system generally according to FIG. 1, having a multiple output SVGA display driver 24, 25, 26, 27, STB model MVP-4X, driving SVGA monitors 16, 18, 20, 22, each having touchscreens 17, 19, 21, 23, respectively. A single virtual display space is provided for the applications. As shown in FIG. 4, a single application window $A_1, A_2, A_3$, B, is maximized on each monitor, presenting each user with exclusive access to that window. The applications $A_1, A_2, A_3$ are multiple copies or instances of the same application, while application B is a different application. These applications are tiled across the virtual desktop so they appear maximized on each display. Touchscreens 16, 18, 20, 22 may be simultaneously used, with no interference between various users.

Multiple copies or instances of a point of sale program, or different programs, are run, with separate windows in the virtual display space. Each of the windows is presented on a separate monitor. The touchscreen of each monitor therefore overlays a separate window. A touch on one of the touchscreen surfaces over a window triggers an event in the operating system which causes that window to be "active", gain focus or switch context. Each POS application may have daughter windows, dialog boxes, or the like; however each of these screen objects is provided in a manner such that any sequence of inputs may be interrupted, i.e., an open dialog box does not lock the input, preventing switching of contexts.

Because these GUI operating systems are essentially designed for use at any one time by a single user, the general programming model provides for but a single master program, i.e., Program Manager in Windows, Finder in Macintosh, etc. Therefore, it is preferred that this high level functionality be hidden or inaccessible from any normal or aberrant user input, in order to avoid disruption of system activity for all users. In addition, while generally GUIs may be used as a primary input to interact with the systems, often functionality may also be accessed from a keyboard. Therefore, in a preferred embodiment, a keyboard is not available for normal users. Alternately, a keyboard input is filtered to prevent unintended disruption of other users and the input data associated with a corresponding pointing device input.

Normally, drag operations are uninterruptable from a system standpoint, but this need not be the case, as with an event driver architecture, a "release" event may be determined without requiring continuity of input of "depress" events.

Therefore, it is a fundamental element of the present invention that, in a unified event-driven environment, an event server is provided having sufficient bandwidth to process event streams from a plurality of input devices in quasi-real-time, allowing event streams from different sources to be processed generally in order of occurrence. It is noted that the system is not necessarily a real-time processor, and events from differing sources need not be processed in strict order of time occurrence. Events from the same source should be processed in order, although they may be batched. Batching of events may be efficient where a series of events corresponds to a command input. It is noted that cursor movement events should be precessed in as close to real-time as possible, and it is possible to execute these commands out of order, i.e., by placing other types of commands in a queue. Thus, events may be processed in at least two phases, a determination of type and an execution phase.

Thus, using a touchscreen, a touch or release in an area causes an event which includes the time (or sequence) of the touch or release as well as the location of the touch or release. If the touch is on a screen area which is not controlled by a window, then the event is processed by the supervisory program, and as a result may produce no visible effect. If, on the other hand, the touch or release is on a screen area controlled by an open window, it is processed by a control program for that window. If the touch or release is on an area overlying an inactive window, in certain circumstances, the supervisory program may intercept the event to make that window active, without further processing. This is normally a "safety" feature based on the presumption that transferring control between windows is not a normal mode of operation and that therefore a delay should be imposed to prevent inadvertent execution by a program controlling a window which was recently inactive. According to the present invention, this safety feature is eliminated or altered in most cases, so that the touch or release causes a focus change to the controlling program and a command within that program or window. Thus, an active window and an inactive window each appear to respond identically to a touch input event. Thus, since the active and inactive windows appear to operate identically, further discussion will focus on the inactive window, with active windows requiring possibly fewer steps. Prior art systems may provide a visual change between active and inactive windows, however, according to the present invention, it may be preferable to have an identical appearance to give the effect of continuous user control over the system, when in fact the resources are being shared.

In a multiuser interface system, in order to allow a user to receive feedback from a touch event instantaneously, and to prevent interspersing of events from other user inputs, interrupts caused by other users are blocked until the a mouse move, click down and click up events are queued in the interrupt service routine. While this may delay slightly imperceptibly to the user the initial response of the system to a user input, it allows uninterrupted response during an input.

In a single user system, a window may be dragged between display units by touching the window with one hand while simultaneously touching the intended location with the other hand, on a different display unit, and subsequently lifting the touch on the first display, whereby the window will move to the location on the second display unit.

When the drag event is initiated, the first touch event is detected, with the series of coordinates used to move the object. So long as the touch is not interrupted, the window remains in a drag state. The interrupts caused by other simultaneous events are handled in queued sequence. This is especially true where touchscreens or input devices for each display have the same interrupt rate. The system hardware has sufficient bandwidth such that each input device has a fluid cursor movement and apparent full control over the system. Thus, in contrast to standard-type systems, input events continue to be received and processed even as one input device causes a stream of events, such as by continual touch or mousebutton depression. Thus, multiple input devices may appear to simultaneously drag the same screen object fluidly as the object quickly moves back and forth to the position defined by each interlaced interrupt, without mutual interference.

Alternate to allowing the standard system supervisory program to control switching among multiple windows, which may be multiple instances of the same application, a specialized application program may be provided which occupies the entire virtual screen area, and thus all inputs are processed through the specialized application program. The specialized application program, in turn, may have daughter windows which may optionally conform to standard program objects of the system or be totally custom. Thus, in the case of a multi-screen application program, no modifications are necessary to event processing at the operating system or supervisory system level.

Figure 5:
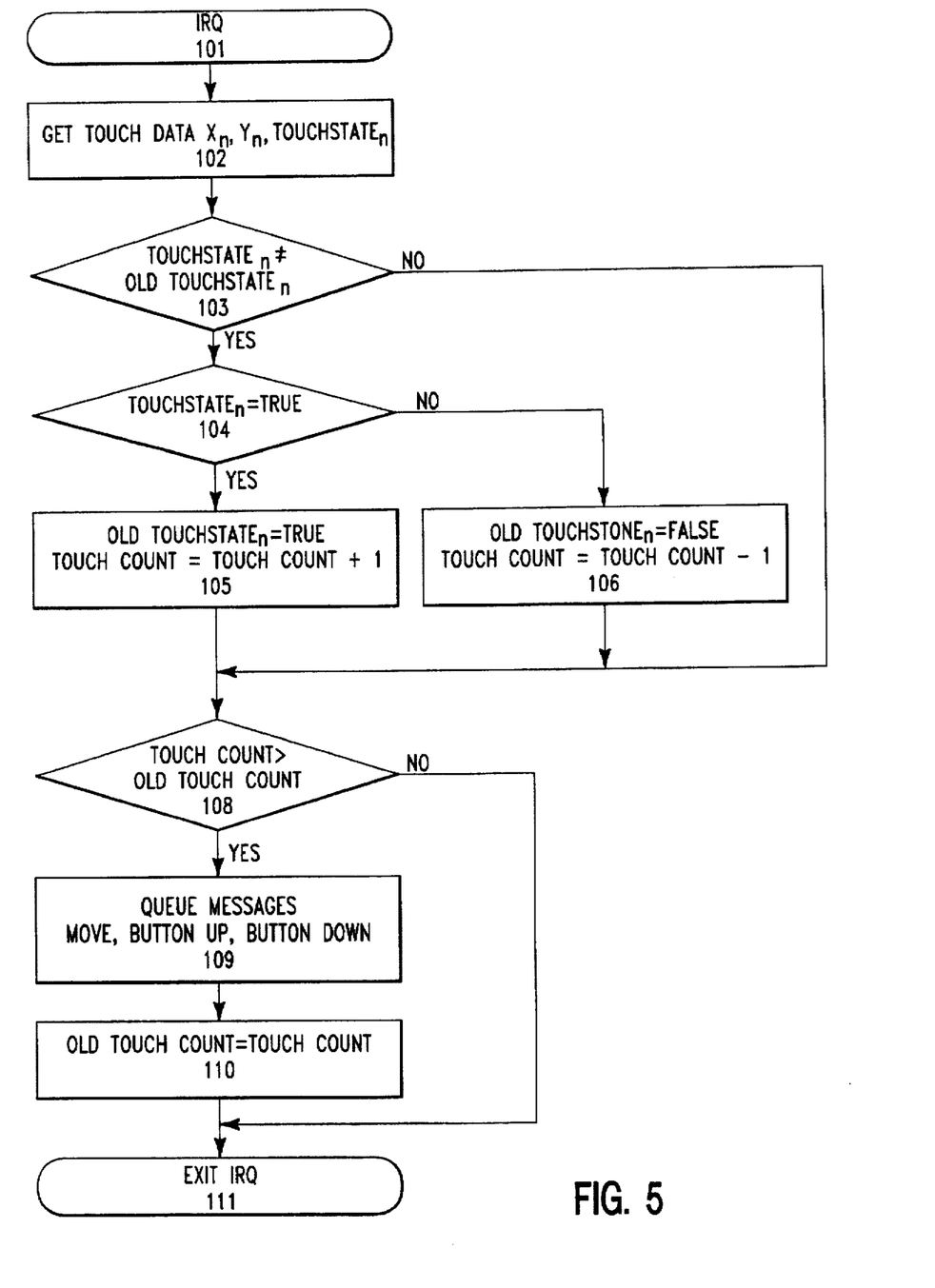
FIG. 5 is a flow chart for a first mode of operation according to the present invention.
Figure 6:
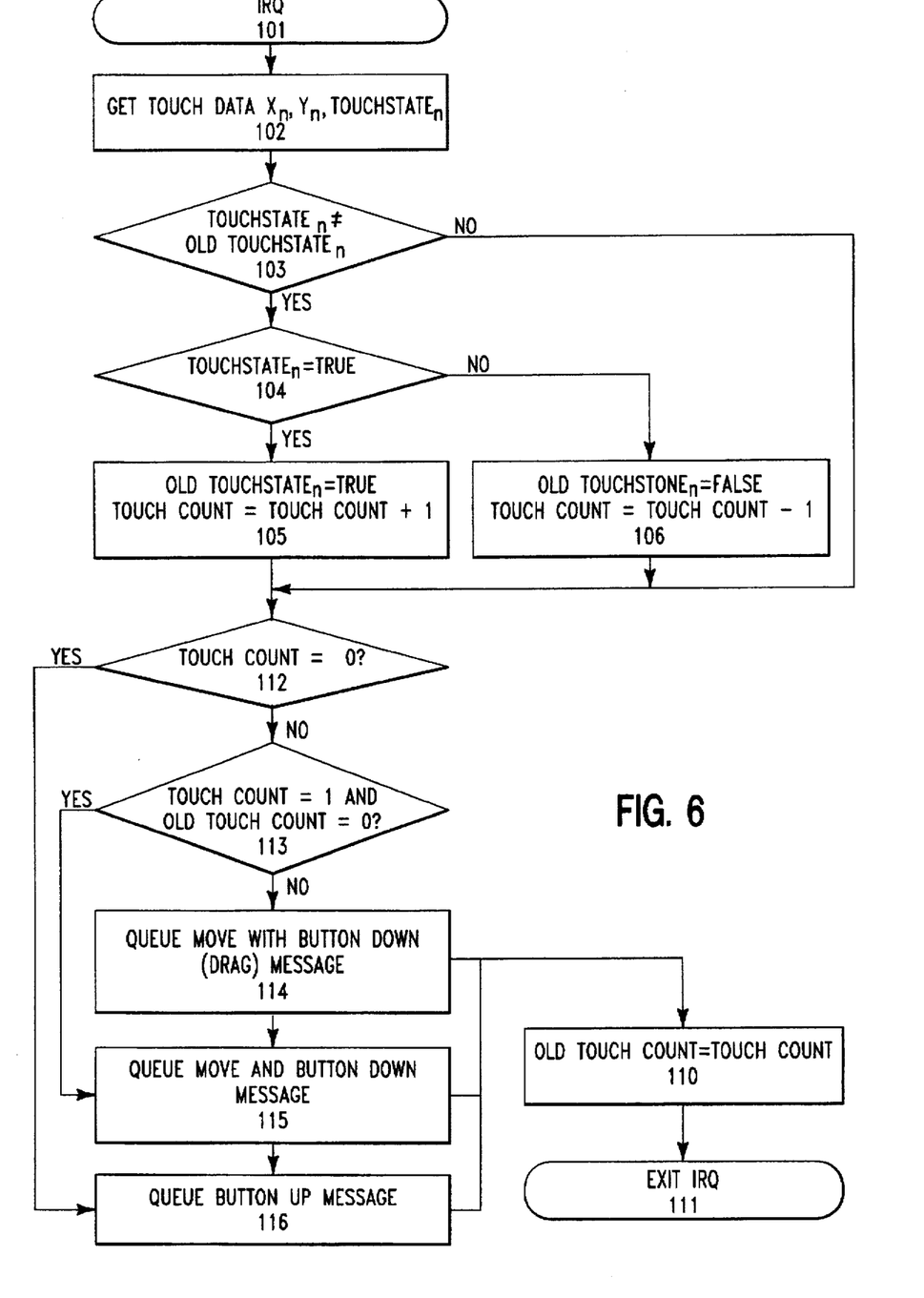
FIG. 6 is a flow chart for a second mode of operation according to the present invention.
Figure 7:
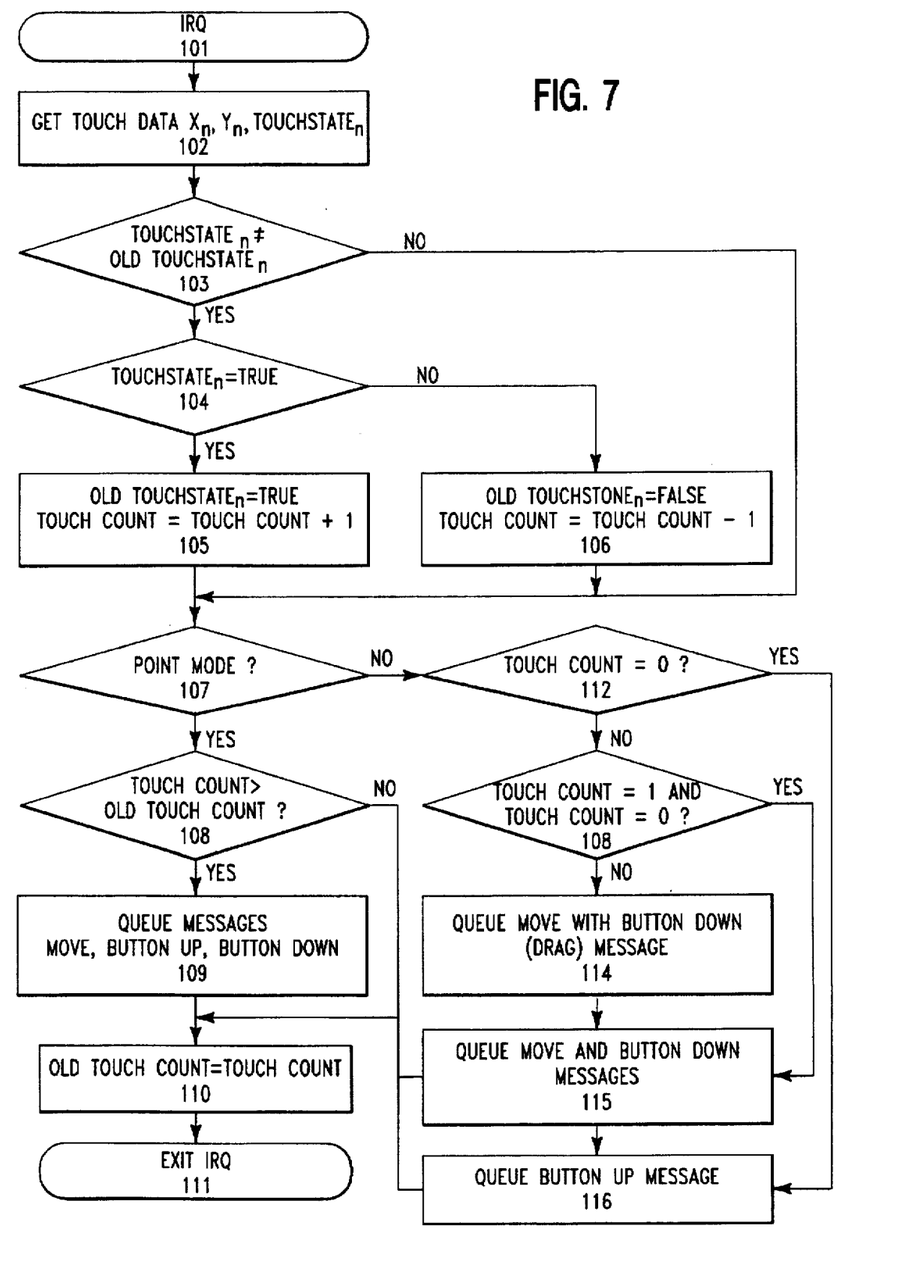
FIG. 7 is a flow chart combining first and second modes of operation according to the present invention.

The method according to the present invention is described in the flow charts presented in FIGS. 5, 6 and 7. FIG. 5 shows a first, multi-user, point mode of operation, while FIG. 6 shows a second, single user, drag mode of operation. FIG. 7 shows a system optionally having both the first, point mode and the second, drag mode of operation.

Each touchscreen input produces an interrupt, which is captured by an interrupt service routine 101. Touch data, including coordinates (X, Y) and touching information 102. The touch data is then tested to see if a touching state has changed 103, e.g., whether there is a new touch or release. If there is a change 103, and a touch is present 104, a counter is incremented 105. If there is a change 103, and a touch is not present 104, a counter is decremented 106.

In FIG. 7, two modes of operation are provided, which are selectively executed 107. In the point mode, the critical decision is whether the counter is incremented in the initial processing step, i.e., whether the new counter value is greater than the initial counter value 108, indicating a new touch. Is the new value is greater, a series of event messages are queued, a move, button up and button down messages 109, and the old touch counter is updated 110. The interrupt service routine is then terminated 111. In this mode, the various inputs are independent and do not interfere with each other, as only a new touch event generates messages.

In the drag mode, the critical decision are whether the touch counter transitions to 112 or from zero 113. If the touch counter is one and the prior touch counter value is zero, then move and button down messages are queued 115. Otherwise, a move with button down message (drag) 114 is generated. If the touch counter is now zero, a button up message is generated 116. The touch counter is updated 110. The interrupt service routine is then terminated 111. This allows the first touch to produce the button down message, and the last release to generate a button up message. Thus, in the drag mode, various inputs are interactive.

Figure 8:
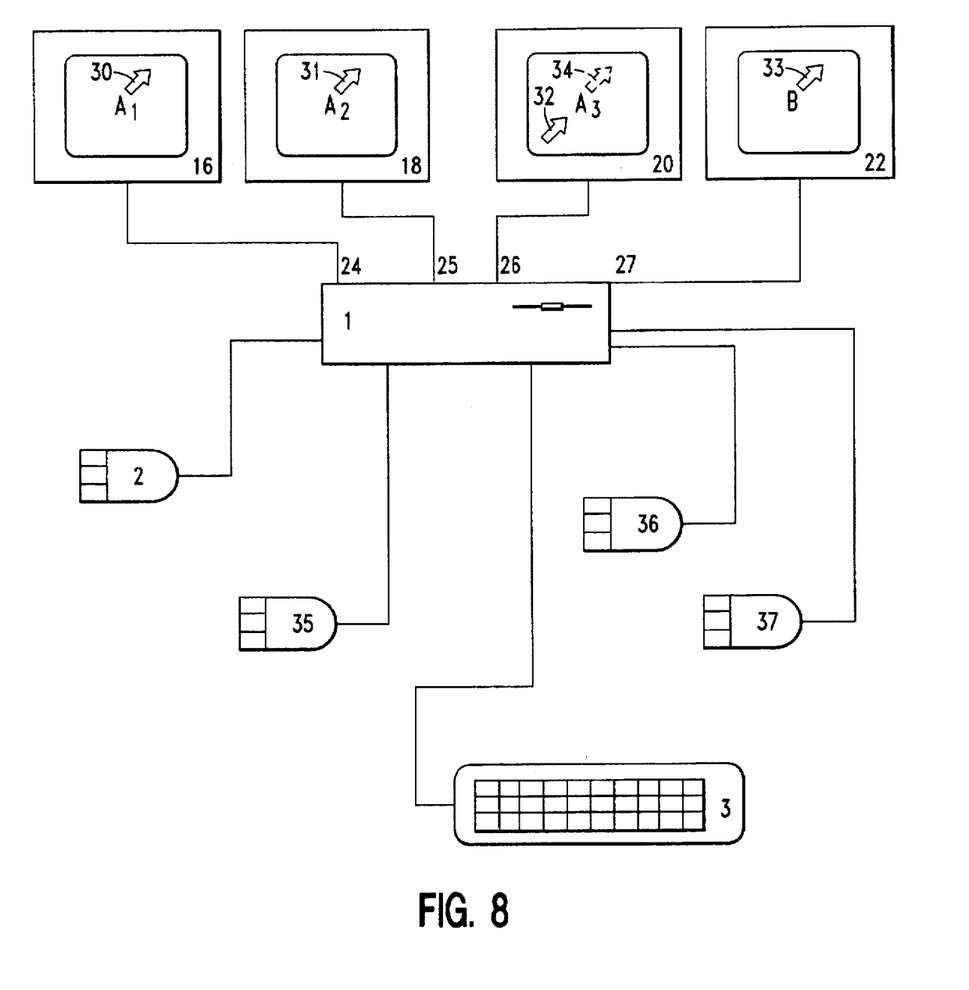
FIG. 8 shows four visible user cursors and an invisible system cursor on a virtual desktop spread across four monitors, as shown in FIG. 4.

FIG. 8 shows four visible user cursors 30, 31, 32, 33 and an invisible standard system cursor 34 on a virtual desktop spread across four monitors, 16, 18, 20, 22 as shown in FIG. 4. Each of the visible user cursors are associated with relative pointing devices 2, 35, 36, 37, respectively. According to this system, position of the user cursor for each of the four pointing devices system. The cursor generation functions are maintained by a device driver or application program. The device driver or application program maintains variables $LastUserX_n$, $LastUserY_n$, storing absolute coordinates for each user cursor. Other information regarding the history of user input may also be stored, such as velocity and gestures.

When a relative motion is received from a pointing device, e.g., 2, 35, 36 or 37, the associated user cursor position is updated using known methods, generally based on the LastUserX$_n$, LastUserY$_n$, and optionally other user input information. The visible user cursor, e.g., 30, 31, 32 or 33, however, does not always correspond directly to relative motion under the following circumstances. The user cursor is limited to movement within the associated virtual display window. The system cursor 34, which can be located anywhere across the virtual desktop, is not necessarily moved, as a result of pointing device input. The system cursor 34 may be kept invisible, or having different graphic characteristics. The system cursor 34 is updated, and system mouse events generated, according to the methods of FIGS. 5, 6 and 7.

Figure 9:
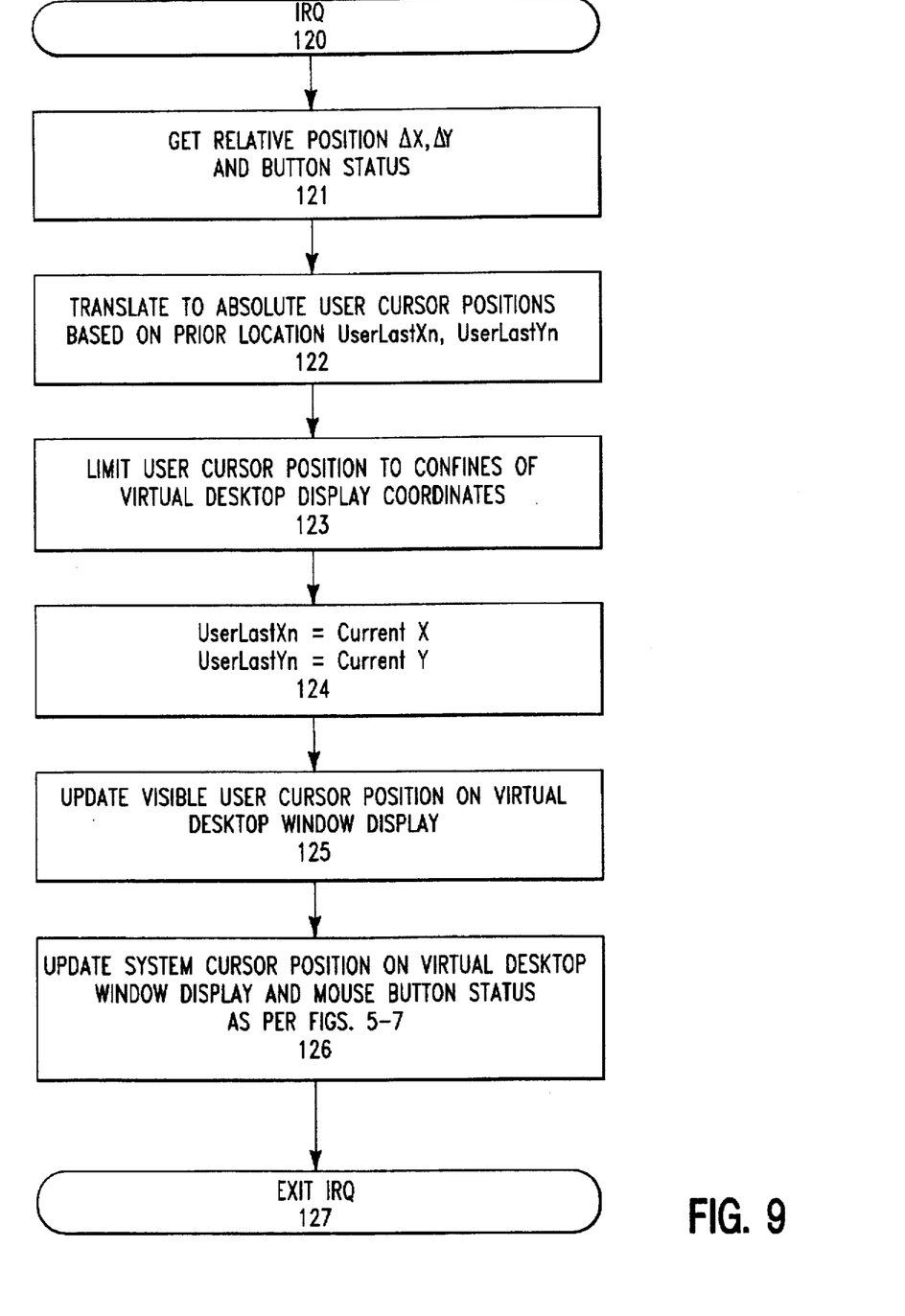
FIG. 9 shows a flow chart for processing a relative position pointing device input.

The operating system is provided with absolute pointing device positions, even when relative motion-type devices are used. Therefore, the method shown in FIG. 9 preprocesses pointing device inputs from relative motion-type devices, and is generally not employed with absolute position-type devices. One relative motion-type pointing device may optionally remain associated with the system cursor, as in known systems, and have access to all normal operating system pointing device input functions.

Where a relative position pointing device is employed, such as a mouse 2, prior to processing the pointing events according to the procedures of FIGS. 5, 6 and 7, a preprocessing procedure according to FIG. 9 is employed. This preprocessing procedure performs two functions. First, a user cursor is generated for the pointing input device at a position related to the past history of use of the pointing device. Second, the message passed to the operating system related to the pointing device input is translated to an absolute coordinate position.

An interrupt 120 is generated by pointing device use. The relative motion of the pointing device is determined 121, and processed in conjunction with stored information relating to the past history of use of a particular pointing device, e.g., a set of stored coordinates. This stored information may also be more complex, for example including velocity data for use in computing ballistic cursor movements, or gestures, as in known systems. A user absolute coordinate position is thus computed 122. The user cursor movement is limited within the virtual display space 123. The stored information is updated 124. The user cursor position is then displayed 125 on the display device associated with the particular pointing device.

The pointing device message is then prepared and transmitted as absolute coordinate X, Y, referred to as touch data in step 102 of FIGS. 5, 6 and 7, and the interrupt service routine terminated 127.

There has thus been shown and described novel aspects of multi-input systems, which fulfill all the objects and advantages sought therefor. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a computer system including a processor, and employing a graphic user interface having a virtual display space, executing an event-driven control program, with a unified user pointing input event stream processing system, the improvement comprising:

the control program receiving at least first and second user inputs representing different locations within said virtual display space, each of said user inputs being associated with the production of events of said control program and being processed without distinction between said first user input and said second user input; and said control program having an operational mode for processing a series of events related to a first user input without apparent functional interference with a concurrent series of events related to a second user input.

2. The computer system according to claim 1, wherein said event-driven control program is a graphical user interface system selected from the group consisting of Windows, Windows for Workgroups, Windows NT, Windows 95, OS/2 and Macintosh operating system.

3. The computer system according to claim 1, further comprising a plurality of displays, each displaying a portion of the virtual display space.

4. The computer system according to claim 3, wherein at said plurality of displays each display a differing portion of the virtual display space.

5. The computer system according to claim 1, wherein at least one of said user inputs comprises absolute position coordinates.

6. The computer system according to claim 5, wherein said user input receives absolute position coordinates from a touch-sensitive device superimposed on said display, so that a touch directed at a corresponding display location of said touch sensitive device directs a cursor to said display location.

7. The computer system according to claim 5, wherein said user input receives absolute position coordinates from a touchscreen.

8. The computer system according to claim 1, comprising at least two display devices, each displaying a differing portion of said virtual display space, and at least two user input devices.

9. The computer system according to claim 1, further comprising a plurality of display devices, each having an associated user input, wherein each display and associated user input set are provided with equivalent capabilities.

10. The computer system according to claim 1, wherein said virtual display space includes a plurality of objects, each user input being associated with one of said objects.

11. The computer system according to claim 10, wherein said plurality of objects comprises a plurality of application windows.

12. The computer system according to claim 10, wherein said control program supports applications having application windows, an application associated with an application window receiving events from the control program and further processing events relating to a user input associated with said application window.

13. The computer system according to claim 1, further comprising a plurality of displays, each displaying a differing portion of said virtual display space, said control program responding to WIN16, WIN32 or OS/2 API syntax.

14. The computer system according to claim 1, further comprising:
a processor, having:
a counter;
a memory for storing a state of said counter;
means for incrementing said counter upon an activate input status from any of said inputs and decrementing said counter upon an inactivate input status from any of said inputs;

point mode means for generating cursor move to said position, button down and button up messages in sequence if said counter is incremented; and means for updating said stored state of said counter.

15. The computer system according to claim 1, further comprising:

a processor, having:

a counter;

a memory for storing a state of said counter;

means for incrementing said counter upon an activate input status from any of said inputs and decrementing said counter upon an inactivate input status from any of said inputs;

drag mode means for generating a button up message if said counter transitions to a value of zero, generating a button down message if said counter transitions to a value of one and said stored initial state transitions to a value of zero, and otherwise maintaining a button down message state; and means for updating said stored state of said counter.

16. The computer system according to claim 1, further comprising a system for converting an output of a relative pointing position user input to a display coordinate position, and a system for displaying a user cursor, based on said relative pointing position user input and independent of said control program, on said display.

17. An event-driven graphical user interface system having a virtual display space including a plurality of objects, comprising:

a user input interface, being responsive to a plurality of user inputs from identified user input devices, said user inputs each being associated with at least one object, and being associated with the production of events substantially undistinguished by a user input device identification;

said interface system having a mode for processing a time series of events related to a first user input relating to a first object and a concurrent time series of events related to a second user input relating to a second object, without mutual interference.

18. The event-driven graphical user interface according to claim 17, further comprising a control program for controlling said graphical user interface, having a single system cursor, a system for converting events generated by an output of a relative pointing position user input to a display coordinate position, and a system for displaying a user cursor, based on said relative pointing position user input and independent of said system cursor, on said graphical user interface.

19. An event-driven graphical user interface system having a unified virtual display space including a plurality of objects, comprising:

a user input interface producing events relating to a plurality of user inputs from at least one identified user input device;

said interface system concurrently processing a series of events substantially without reference to an user input device identification, related to a first of said plurality of user inputs and a series of events related to a second of said plurality of user inputs, without mutual interference.

20. The event-driven graphical user interface according to claim 19, wherein said interface system has a single system cursor, further comprising a system for converting events generated by an output of a relative pointing position user input to a display coordinate position, and a system for displaying a user cursor, based on said relative pointing position user input and independent of said system cursor, on said graphical user interface.

21. An input processor for a graphical user interface system having a unified virtual display space, comprising:

an input for receiving inputs from a plurality of user pointing device inputs, defining a position and an input status; and a processor, having:

a counter;

a memory for storing a state of said counter;

means for incrementing said counter upon an activate input status from any of said inputs and decrementing said counter upon an inactivate input status from any of said inputs;

point mode means for generating cursor move to said position, button down and button up messages in sequence if said counter is incremented; and means for updating said stored state of said counter.

22. The system according to claim 21, wherein said processor further comprises:

means for selecting a mode of operation, selecting between said point mode means; and drag mode means for generating a button up message if said counter transitions to a value of zero, generating a button down message if said counter transitions to a value of one and said stored initial state transitions to a value of zero, and otherwise maintaining a button down message state.

23. The system according to claim 21, wherein said processor further comprises a control program having a system cursor, a system for converting said relative position pointing device input to a display coordinate position, and a system for displaying a user cursor, based on said relative position pointing device input and independent of said system cursor, in said unified virtual display space.

24. An input processor for a graphical user interface system having a unified virtual display space, comprising:

an input for receiving inputs from a plurality of user pointing device inputs, defining a position and an input status; and a processor, having:

a counter;

a memory for storing a state of said counter;

means for incrementing said counter upon an activate input status from any of said inputs and decrementing said counter upon an inactivate input status from any of said inputs;

drag mode means for generating a cursor move to said position and button down message in sequence if said counter transitions to one, generating a button up message if said counter transitions to a value of zero, and otherwise maintaining a drag state with move with button down messages; and means for updating said stored state of said counter.

25. The system according to claim 24, wherein said processor further comprises:

means for selecting a mode of operation, selecting between said drag mode means and point mode; and means for generating "cursor move to said position", "button down" and "button up" messages in sequence if said counter is incremented.

26. The system according to claim 24, wherein said processor further comprises a control program having a system cursor, a system for converting said relative position pointing device input to a display coordinate position, and a system for displaying a user cursor, based on said relative position pointing device input and independent of said system cursor, in said unified virtual display space.

27. In a graphical user interface system having an event-driven control program with a unified user input pointing event stream without distinction of source and a graphical user interface having a virtual display space containing objects, the improvement comprising:

the control program processing events related to a plurality of user inputs representing different locations within the virtual display space;

the control program having one or more modes selected from the group consisting of:

(a) an operational mode for permitting said plurality of user inputs interact to allow an object in the virtual display space at a first location specified by an initial user input to be associated with a second location specified by a concurrent and subsequently terminating user input, the control program having a counter which increments on activity of any user input and decrements on cessation of activity of any user input, for determining an initial user input condition, temporal concurrence of a plurality of user inputs, and a terminal user input condition; and (b) a second operating mode for processing a series of events related to a first user input without apparent functional interference with a concurrent series of events related to a second user input.

28. The graphical user interface system according to claim 27, wherein the control program includes both mode (a) and mode (b).

29. The graphical user interface system according to claim 27, wherein the control program includes mode (a).

30. The graphical user interface system according to claim 27, wherein the control program includes mode (b).

31. The graphical user interface system according to claim 30, wherein the control system comprises a counter, incrementing on occurrence of an event related to a user input and decrementing on cessation of an event related to a user input.

32. The event-driven graphical user interface according to claim 19, wherein:

each event is associated with a location and a touch status within said virtual display space independent of other inputs;

said interface system having a mode for processing a series of events associated with a plurality of different inputs, wherein an object at a location associated with an initial input is transferred to a location associated with a coexistent terminal input, comprising a counter for tracking a touch status to determine a beginning of said initial input and an end of said terminal input.

* * * * *